United States Patent
Watabe

(10) Patent No.: US 9,610,507 B2
(45) Date of Patent: Apr. 4, 2017

(54) NON-TRANSITORY COMPUTER READABLE MEDIUM STORING GAME PROGRAM FOR MOVING A PLAYER CHARACTER ON A GAME FIELD

(71) Applicant: DeNA Co., Ltd., Tokyo (JP)

(72) Inventor: Yoshiki Watabe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/736,732

(22) Filed: Jun. 11, 2015

(65) Prior Publication Data

US 2015/0273343 A1 Oct. 1, 2015

Related U.S. Application Data

(63) Continuation of application No. 14/271,735, filed on May 7, 2014, now Pat. No. 9,079,100.

(30) Foreign Application Priority Data

Jul. 31, 2013 (JP) ................................. 2013-158627

(51) Int. Cl.
*A63F 9/24* (2006.01)
*A63F 13/822* (2014.01)
(Continued)

(52) U.S. Cl.
CPC ............ *A63F 13/822* (2014.09); *A63F 13/00* (2013.01); *A63F 13/2145* (2014.09);
(Continued)

(58) Field of Classification Search
None
See application file for complete search history.

(56) References Cited

U.S. PATENT DOCUMENTS

2006/0217196 A1* 9/2006 Kikkawa ................ A63F 13/10
463/30
2007/0174042 A1 7/2007 Thompson
(Continued)

OTHER PUBLICATIONS

Civilization, Units, Apr. 19, 2012, http://www.civilizationrevolution.com/iphone/manual/units.html.*
(Continued)

*Primary Examiner* — Jason Yen
(74) *Attorney, Agent, or Firm* — Procopio, Cory, Hargreaves & Savitch LLP

(57) ABSTRACT

A non-transitory computer-readable storage medium storing game program according to the present invention causes a computer to execute: an automatic move process of automatically moving a player character on a game field toward a first destination on the basis of destination information regarding a destination set in the game field, when an operation input to start an automatic move of the player character on the game field is received from a player; a destination change process of changing the first destination to a second destination on the basis of the destination information when an operation input to change the destination is received from the player while the player character is on the automatic move; and an automatic move changing process of automatically moving the player character, moving toward the first destination on the game field, toward the second destination.

4 Claims, 13 Drawing Sheets

(51) Int. Cl.
*A63F 13/00* (2014.01)
*A63F 13/2145* (2014.01)
*A63F 13/57* (2014.01)
*A63F 13/95* (2014.01)

(52) U.S. Cl.
CPC .............. *A63F 13/57* (2014.09); *A63F 13/95* (2014.09); *A63F 2300/1075* (2013.01)

(56) References Cited

U.S. PATENT DOCUMENTS

| | | | |
|---|---|---|---|
| 2008/0291173 | A1 | 11/2008 | Suzuki |
| 2009/0104990 | A1* | 4/2009 | Tsujino .................. A63F 13/04 463/32 |
| 2009/0247300 | A1* | 10/2009 | Suzuki .................... A63F 13/10 463/37 |
| 2010/0267435 | A1* | 10/2010 | Taya ....................... A63F 13/10 463/2 |
| 2010/0306717 | A1* | 12/2010 | Yamada .................. A63F 13/56 715/863 |
| 2012/0185262 | A1 | 7/2012 | Dalesandro et al. |
| 2012/0252569 | A1* | 10/2012 | Harp ....................... A63F 13/10 463/29 |

OTHER PUBLICATIONS

Civfanatics, Civ3Keys, 2012, http://www.civfanatics.net/downloads/civ3/reference/Civ3Keys.pdf.*
Japanese Patent Application No. 2014-010070: Office Action mailed on Jul. 1, 2014.
Civilization Revolution, Sid Meier's Civilization Revolution, http://www.civilizationrevolution.com/iphone/manual/units.html, Nov. 5, 2011.

* cited by examiner

FIG. 3

| GAME ID | GAME NAME | GAME PROGRAM | GAME DATA | |
|---|---|---|---|---|
| 0001 | ○○○○ | ○○○○.apk | ○○○○ | ... |
| ⋮ | ⋮ | ⋮ | ⋮ | |

FIG. 4

| PLAYER ID | PLAYER NAME | GAME ID | GAME DATA | |
|---|---|---|---|---|
| 0001 | ○○○○ | 0001 | ○○○○ | ... |
| | | 0005 | ○○○○ | |
| | | ⋮ | ○○○○ | |
| ⋮ | ⋮ | ⋮ | ⋮ | |

FIG. 6

| GAME FIELD ID | GAME FIELD NAME | DESTINATION INFORMATION | OBJECT INFORMATION | |
|---|---|---|---|---|
| 001 | FIELD A | DESTINATION INFORMATION (1) | OBJECT INFORMATION (1) | ... |
| 002 | FIELD B | DESTINATION INFORMATION (2) | OBJECT INFORMATION (2) | |
| ⋮ | ⋮ | ⋮ | ⋮ | |

FIG. 7

| DESTINATION INFORMATION (1) || DESTINATION INFORMATION (2) |
| --- | --- | --- |
| No. | DESTINATION NAME | DESTINATION NAME |
| 1 | LODGING | TOWN |
| 2 | WEAPON SHOP | CASTLE |
| 3 | TOOL SHOP | CAVE |
| 4 | PRIVATE HOUSE 1 | TOWER |
| 5 | PRIVATE HOUSE 2 | SPRING |

FIG. 8

| OBJECT INFORMATION (1) || OBJECT INFORMATION (2) |
| --- | --- | --- |
| OBJECT ID | OBJECT NAME | OBJECT NAME |
| 001 | TREASURE BOX A | ITEM F |
| 002 | CHARACTER A | ENEMY CHARACTER D |
| 003 | ROCK A | TREE B |
| ⋮ | ⋮ | ⋮ |

NON-TRANSITORY COMPUTER READABLE MEDIUM STORING GAME PROGRAM FOR MOVING A PLAYER CHARACTER ON A GAME FIELD

This application claims the benefit of foreign priority under 35 USC §119(a) based on Japanese Patent Application No. 2013-158627, filed on Jul. 31, 2013, granted as Japanese Patent No. JP 5467168 B1, granted on Apr. 9, 2014, as well under 35 USC §120 as a continuation of U.S. patent application Ser. No. 14/271,735, filed on May 7, 2014, now U.S. Pat. No. 9,079,100, issued on Jul. 14, 2015, the contents of which are incorporated herein by reference in their entirety.

BACKGROUND OF THE INVENTION

Field of the Invention

The present invention relates to a game program and an information processing device.

Description of Related Art

There is known a game program for an RPG (Role-Playing Game) where a story progresses while a player character moves on a game field according to an operation by a player to have a conversation with another character or fight a battle (JP 2002-239217 A, for example).

SUMMARY OF THE INVENTION

Technical Problem

When moving the player character on the game field, the player has had to grasp a destination to which the player character is headed and input an operation to specify at least a move direction of the player character.

The player has then had to repeatedly input the operation to specify the move direction of the player character when a route to the destination is complicated, for example, so that the move direction is changed along the route.

The present invention has been made in consideration of the aforementioned situations, and an object of the present invention is to improve operability related to movement of the player character.

Solution to Problem

A main aspect of the present invention that solves the aforementioned problem is a game program which causes a computer to execute: an automatic move process of automatically moving a player character on a game field toward a first destination on the basis of destination information that is a piece of information regarding a destination set in the game field, when an operation input to start an automatic move of the player character on the game field is accepted from a player; a destination change process of changing the first destination to a second destination on the basis of the destination information when an operation input to change the destination is accepted from the player while the player character is on the automatic move; and an automatic move changing process of automatically moving the player character, moving toward the first destination on the game field, toward the second destination. Other features of the present invention will be apparent from the description of the present specification and the appended drawings.

Advantageous Effect of the Invention

The operability related to the movement of the player character can be improved according to the present invention.

BRIEF DESCRIPTION OF THE DRAWINGS

FIG. 3 is a diagram illustrating an example of a data structure of game information;

FIG. 4 is a diagram illustrating an example of a data structure of player information;

FIG. 6 is a diagram illustrating an example of a data structure of field information;

FIG. 7 is a diagram illustrating an example of a data structure of destination information;

FIG. 8 is a diagram illustrating an example of a data structure of object information;

DETAILED DESCRIPTION OF THE INVENTION

Figure 1:
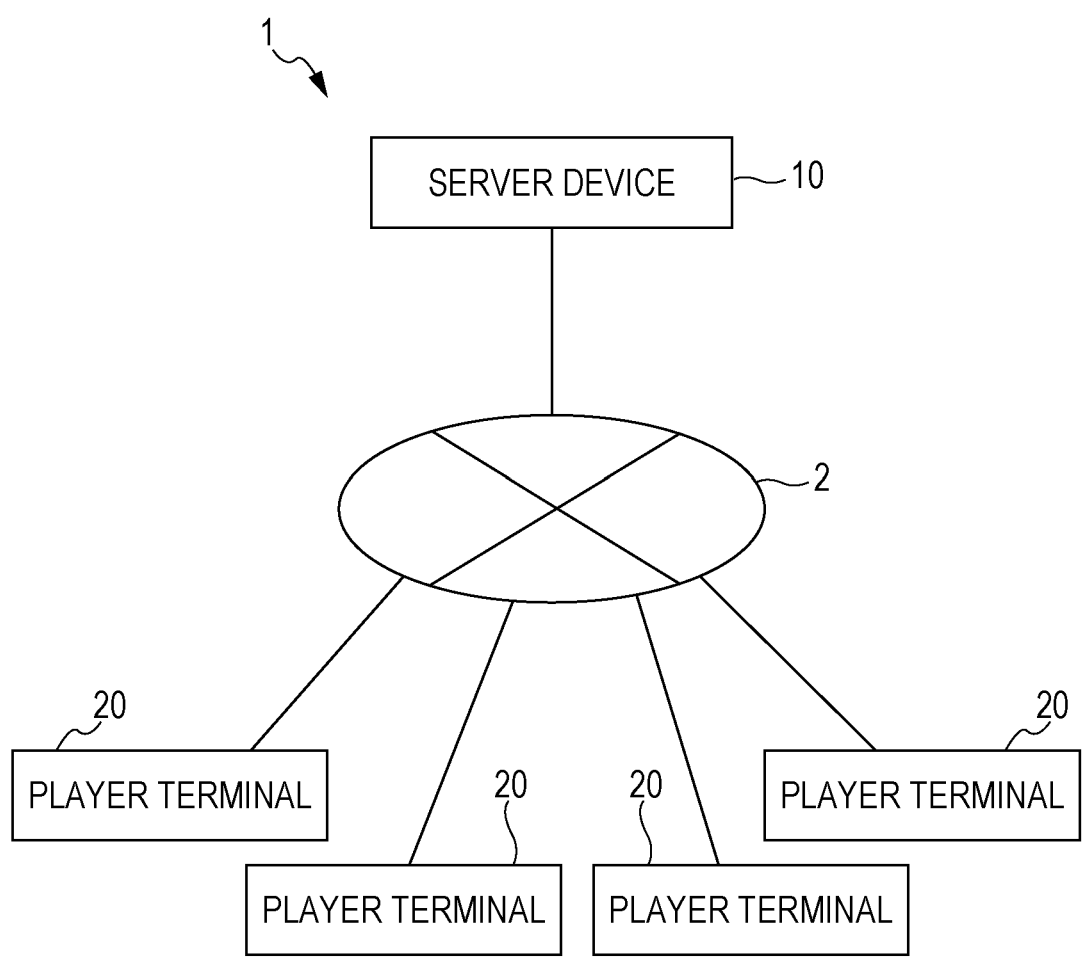
FIG. 1 is a diagram illustrating an overall configuration example of a game system.

At least the following matters will be apparent according to the description of the present specification and the appended drawings.

That is, there is provided a game program which causes a computer to execute: an automatic move process of automatically moving a player character on a game field toward a first destination on the basis of destination information regarding a destination set in the game field, when an operation input to start an automatic move of the player character on the game field is received from a player; a destination change process of changing the first destination to a second destination on the basis of the destination information when an operation input to change the destination is received from the player while the player character is on the automatic move; and an automatic move changing process of automatically moving the player character, moving toward the first destination on the game field, toward the second destination.

According to such game program, the player character can be automatically moved to the destination without the player performing the operation to specify the move direction of the player character, whereby the operability related to the movement of the player character can be improved.

Moreover, the computer may include a display unit which displays a game screen including the player character moving toward a destination on the game field and a touch panel which detects a touch operation input performed by the player on the game screen displayed on the display unit, so that the game program causes the computer to execute a move process of specifying a move direction instructed by the player on the basis of detected information from the touch panel and moving the player character on the game field toward the move direction. In the automatic move process, the player character may be automatically moved toward the first destination when the touch panel detects a touch operation input to start an automatic move of the player character moving by the move process.

According to such game program, the player can easily switch a manual operation to the automatic move while at the same time automatically move the player character to the destination when moving the player character with use of the touch panel, whereby the operability related to the movement of the player character can be improved.

Furthermore, the game program may cause the computer to execute a destination determination process of determining any of a plurality of destinations set on the game field to be the first destination on the basis of the destination information when an operation input to start an automatic move of the player character on the game field is received from the player. In the automatic move process after the first destination is determined, the player character on the game field may be automatically moved toward the first destination without an operation by the player.

According to such game program, the player character can be automatically moved to the destination determined from among the plurality of destinations, whereby the operability related to the movement of the player character can be improved.

Furthermore, the automatic move process may be adapted to cancel the automatic move of the player character on a condition that the player character arrives at the destination set in the game field or that an operation input to stop the automatic move of the player character is received from the player.

According to such game program, the automatic move of the player character can be cancelled upon satisfying the cancellation condition.

Furthermore, the game program may cause the computer to execute a screen generation process of generating a game screen that includes the player character moving automatically on the game field and guidance information indicating a destination to which the player character is headed.

Such game program can allow the player to grasp a current destination while the player character is on the automatic move.

Furthermore, the game program may cause the computer to execute a screen generation process of generating a game screen that includes the player character moving automatically on the game field and a list of a plurality of destinations set in the destination information.

Such game program can allow the player to grasp not only a current destination but another destination while the player character is on the automatic move.

Furthermore, the destination change process may be adapted to change the destination to a new destination that is an object being specified when an operation input to specify the object on the game field is received from the player while the player character is on the automatic move, and the automatic move changing process may be adapted to automatically move the player character, moving toward the first destination on the game field, toward the object that is the new destination after change.

According to such game program, the player can intuitively change the destination by directly specifying the object while the player character is on the automatic move.

Furthermore, the game program may cause the computer to execute a screen generation process of generating a game screen that includes the player character moving automatically on the game field and an object being highlighted on the game field.

Such game program can allow the player to easily recognize an object that can be a new destination while the player character is on the automatic move.

Next, there is provided an information processing device which includes: an automatic move process unit which automatically moves a player character on a game field toward a first destination on the basis of destination information that is a piece of information regarding a destination set in the game field, when an operation input to start an automatic move of the player character on the game field is received from a player; a destination change unit which changes the first destination to a second destination on the basis of the destination information when an operation input to change the destination is received from the player while the player character is on the automatic move; and an automatic move changing process unit which automatically moves the player character, moving toward the first destination on the game field, toward the second destination.

According to such information processing device, the operability related to the movement of the player character can be improved.

Embodiment

Configuration of Game System 1

FIG. 1 is a diagram illustrating an example of an overall configuration of a game system 1 according to the present embodiment. The game system 1 provides a player with various services related to a game through a network 2 (such as the Internet), and includes a server device 10 and a plurality of player terminals 20.

Configuration of Server Device 10

Figure 2:
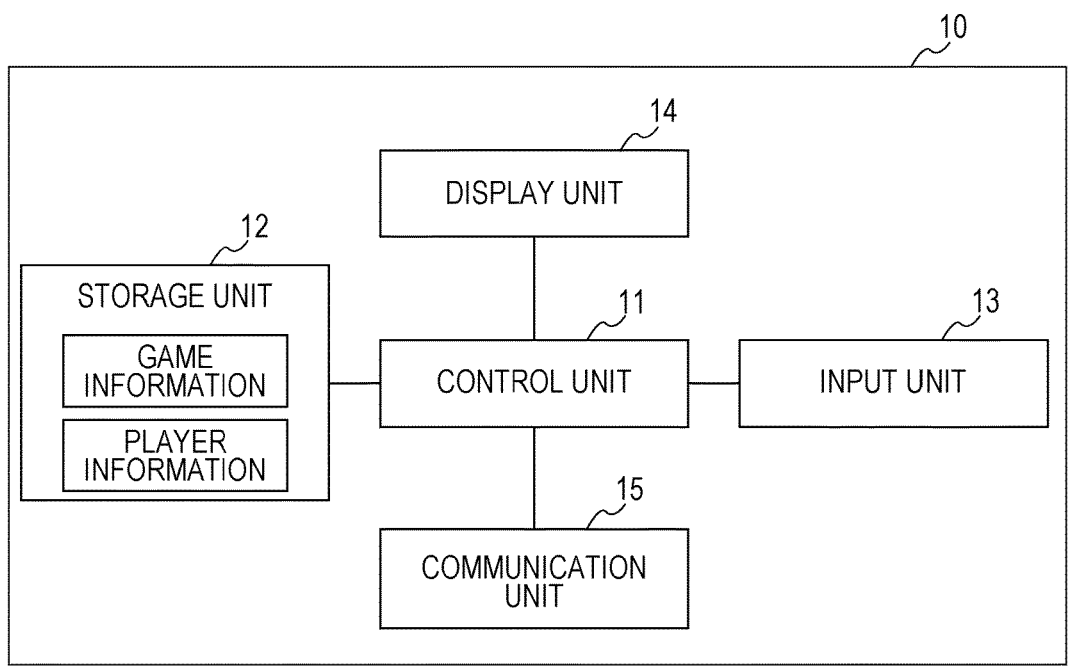
FIG. 2 is a block diagram illustrating a functional configuration of a server device.

FIG. 2 is a block diagram illustrating a functional configuration of the server device 10 according to the present embodiment. The server device 10 is an information processing device (such as a workstation or a personal computer) used when a system administrator or the like administers a game service and, upon receiving various commands (requests) from the player terminal 20, can distribute (respond with) a game program operable on the player terminal 20 and a Web page (such as a game screen) created in a markup language (such as an HTML) meeting the specification of the player terminal 20. The server device 10 includes a control unit 11, a storage unit 12, an input unit 13, a display unit 14, and a communication unit 15.

The control unit 11 is configured to pass data among the units and control the entire server device 10, and is realized by a central processing unit (CPU) executing a program stored in a predetermined memory.

The storage unit 12 includes a read only memory (ROM) that is a read only storage area in which a system program is stored, and a random access memory (RAM) that is a rewritable storage area used as a work area for arithmetic processing by the control unit 11. The storage unit 12 is, for example, realized by a non-volatile storage device, such as flash memory or a hard disk. The storage unit 12 of the present embodiment stores at least game information related to a game program (a game application) that can be provided to the player and player information related to the player.

FIG. 3 is a diagram illustrating an example of a data structure of the game information stored in the storage unit 12 of the server device 10. The game information includes a field corresponding to each of a game ID, a game name, a game program, game data, and the like. The game ID is a piece of identification information identifying the game program (the game application). The game name is a piece of information indicating a display name of the game application provided to the player. The game program is a piece of information indicating a program file. The game data is a piece of information indicating data related to the game program. Accordingly, the player can download a game application of his/her choice from among a plurality of kinds of game applications set in the game information by operating the player terminal 20 and accessing the server device 10.

FIG. 4 is a diagram illustrating an example of a data structure of the player information stored in the storage unit 12 of the server device 10. The player information includes a field corresponding to each of a player ID, a player name, a game ID, game data, and the like. The player ID is a piece of identification information identifying the player. The player name is a piece of information indicating a display name of the player. The game ID is a piece of identification information identifying the game application (a downloaded game application) owned by the player. The game data is a piece of information indicating player data (such as a parameter including a level or the like) related to the game application owned by the player.

The input unit 13 is used by the system administrator or the like to input various pieces of data (such as the game information) and is realized by a keyboard and/or a mouse, for example.

The display unit 14 is used for displaying an operation screen for the system administrator on the basis of a command from the control unit 11, and is realized, for example, by a liquid crystal display (LCD) or the like.

The communication unit 15 is configured to perform communication with the player terminal 20, and includes a function as a reception unit receiving various pieces of data and signals transmitted from the player terminal 20 and a function as a transmission unit transmitting various pieces of data and signals to the player terminal 20 in response to a command from the control unit 11.

Configuration of Player Terminal 20

Figure 5:
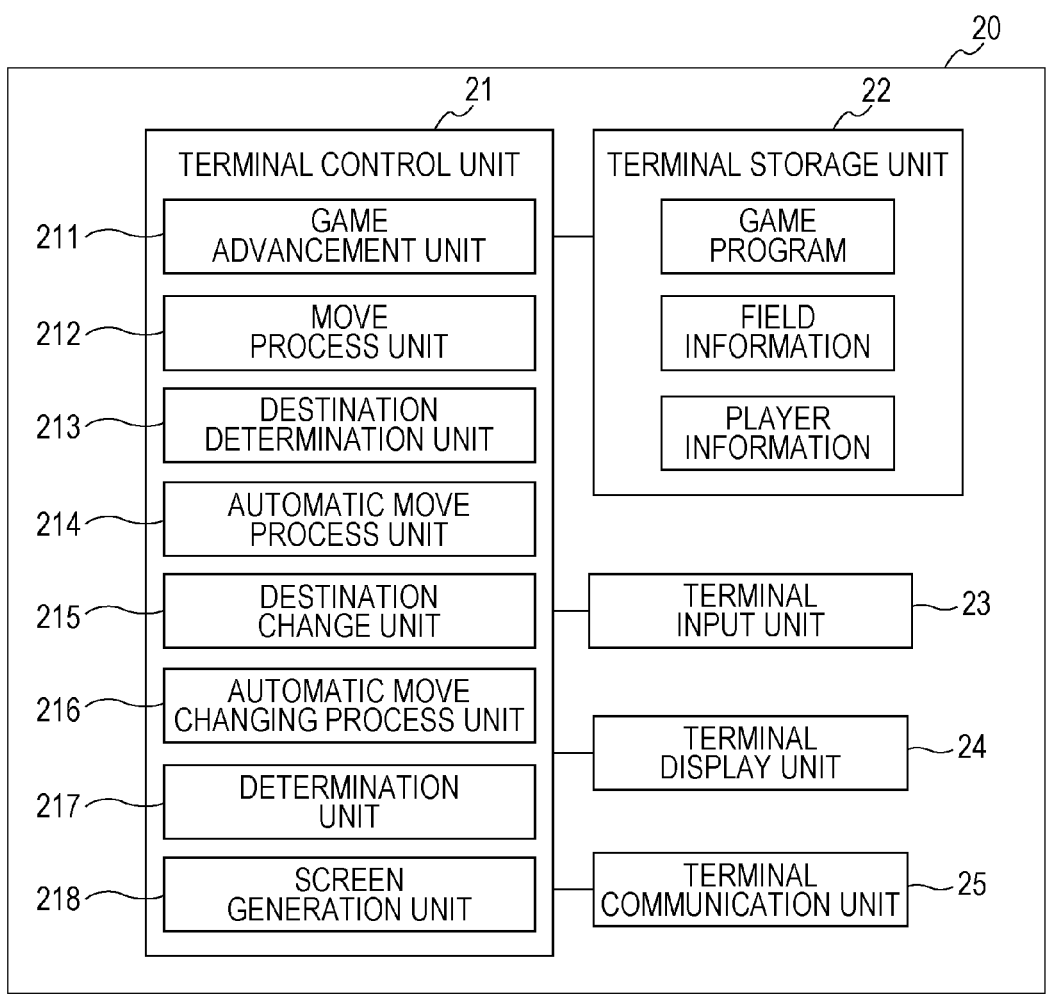
FIG. 5 is a block diagram illustrating a functional configuration of a player terminal.

FIG. 5 is a block diagram illustrating a functional configuration of the player terminal 20. The player terminal 20 of the present embodiment is an information processing device (such as a mobile phone terminal, a smartphone, or a tablet terminal) used by the player when playing a game, and can make a request to the server device 10 to distribute various pieces of information related to the game (such as the game program and the game data). The player terminal 20 includes a terminal control unit 21, a terminal storage unit 22, a terminal input unit 23, a terminal display unit 24, and a terminal communication unit 25.

The terminal control unit 21 is configured to pass data among each unit and perform overall control on the player terminal 20, and is realized when the CPU executes a program stored in a predetermined memory. The terminal control unit 21 of the present embodiment includes a game advancement unit 211, a move process unit 212, a destination determination unit 213, an automatic move process unit 214, a destination change unit 215, an automatic move changing process unit 216, a determination unit 217, and a screen generation unit 218.

The game advancement unit 211 includes a function to execute a process of advancing a game in accordance with a game program. The game advancement unit 211 of the present embodiment advances an RPG in accordance with a game program downloaded from the server device 10.

The move process unit 212 includes a function to execute a process of moving a character on the game field in response to a manual operation from the player. The move process unit 212 of the present embodiment specifies a move direction instructed by the manual operation of the player and moves a player character to be operated by the player along the move direction.

The destination determination unit 213 includes a function to execute a process of determining a destination on the basis of destination information in which a plurality of destinations is set. Upon receiving an automatic operation from the player, the destination determination unit 213 of the present embodiment determines any of the plurality of destinations to be a first destination on the basis of the destination information.

The automatic move process unit 214 includes a function to execute a process of automatically moving a character on the game field in response to the automatic operation from the player. Once the first destination is determined by the destination determination unit 213, the automatic move process unit 214 of the present embodiment automatically moves the player character on the game field toward the first destination. The automatic move process unit 214 cancels the automatic move of the player character when receiving an operation input from the player to stop the automatic move.

The destination change unit 215 includes a function to execute a process of changing a destination on the basis of the destination information in which the plurality of destinations is set, while the character on the game field is on the automatic move. The destination change unit 215 of the present embodiment determines any of the plurality of destinations to be a second destination on the basis of the destination information upon receiving an operation input (a destination change operation) from the player to change the destination while the player character is on the automatic move toward the first destination.

The automatic move changing process unit 216 includes a function to execute a process of automatically moving the character, which is on the automatic move in the game field, toward a changed destination in response to the destination change operation from the player. The automatic move changing process unit 216 of the present embodiment changes the automatic move of the player character on the game field from the first destination to the second destination once the second destination is determined by the destination change unit 215.

The determination unit 217 includes a function to execute various determination processes. The determination unit 217 of the present embodiment determines whether or not the player character on the automatic move has reached the destination, for example.

The screen generation unit 218 includes a function to execute a process of generating screen data used to display the game screen on the terminal display unit 24. The screen generation unit 218 of the present embodiment generates the screen data used to display, on the terminal display unit 24, the game screen including the game field, the player character, an object, guidance information indicating the destination to which the player character is headed, and a list of destinations, for example.

The terminal storage unit 22 is connected to the terminal control unit 21 through a bus, and performs processing of referring to, reading out, or rewriting stored data according to a command from the terminal control unit 21. The terminal storage unit 22 is realized, for example, by flash memory, a hard disk, or the like. The terminal storage unit 22 of the present embodiment stores at least a game program (such as a game application of the RPG) downloaded from the server device 10, field information related to the game field, and the player information downloaded from the server device 10.

FIG. 6 is a diagram illustrating an example of a data structure of the field information stored in the terminal storage unit 22 of the player terminal 20. The field information includes a field corresponding to each of a game field ID, a game field name, destination information, object information, and the like. The game field ID is a piece of identification information identifying the game field within a game space. The game field name is a piece of information indicating a display name of the game field. The destination information is a piece of information related to the destination set in the game field. The object information is a piece of information related to the object placed in the game field.

FIG. 7 is a diagram illustrating an example of a data structure of the destination information. The destination information includes a field corresponding to each of a destination number, a destination name, and the like. The destination number is a piece of information identifying a destination preset on the game field and indicates an order that the destination corresponding to the destination number is automatically selected as a destination when the automatic operation is performed by the player. The destination name is a piece of information indicating a display name of the destination.

FIG. 8 is a diagram illustrating an example of a data structure of the object information. The object information includes a field corresponding to each of an object ID, an object name, and the like. The object ID is a piece of identification information identifying the object placed on the game field. The object name is a piece of information indicating a display name of the object.

The terminal input unit 23 is used by the player to perform various operations (such as a game operation), and is realized by an operation button and/or a touch panel, for example.

The terminal display unit 24 is used for displaying a game screen by a command from the terminal control unit 21, and is realized, for example, by a liquid crystal display (LCD) and the like.

The terminal communication unit 25 is configured to perform communication with the server device 10, and includes a function as a reception unit receiving the game program as well as various pieces of data and signals transmitted from the server device 10 and a function as a transmission unit transmitting the various pieces of data and signals to the server device 10 in accordance with a command from the terminal control unit 21.

Game Overview

Here, an outline of a game provided by the game system 1 of the present embodiment will be described. The player terminal 20 in the game system 1 can allow a player to play a game by first installing a game program downloaded from the server device 10 and thereafter executing the game program.

There will be described a case where the player terminal 20 executes a game program of an RPG, and the terminal input unit 23 of the player terminal 20 is a touch panel. Note that the present invention can also be applied to a game apparatus including a controller.

<Operation of Player Character>

A plurality of game fields is set within the game space in the game program of the RPG according to the present embodiment, where the player can move a player character in each game field by operating the touch panel.

Placed in each game field are an object such as a weapon shop and a tool shop, an object such as a treasure box, a rock, and a tree, and an object such as an enemy character and a villager. Accordingly, the player can purchase a weapon by operating the touch panel to move the player character to the position of the weapon shop. The player can also obtain an item in the treasure box by operating the touch panel to move the player character to the position of the treasure box. Moreover, the player can make the player character battle against the enemy character by operating the touch panel to bring the player character closer to the position of the enemy character.

<Operation of Player Character>

The game program of the RPG according to the present embodiment can allow the player to select either the manual operation or the automatic operation as a method of operation to move the player character on the game field.

When a weapon is to be purchased at the weapon shop, for example, the player on the manual operation needs to grasp the position of the weapon shop that is the destination and then specify the move direction (a traveling direction) of the player character on the touch panel in order for the player character to reach the position of the weapon shop. When there is an obstacle (object) along a straight line connecting the position of the weapon shop and a current position of the player character in particular, the player needs to repeatedly specify the move direction (the traveling direction) of the player character on the touch panel to avoid the obstacle. On the other hand, the player selecting the automatic operation can automatically move (perform the automatic move of) the player character to the position of the weapon shop without specifying the move direction of the player character. The operability related to the movement of the player character can be improved as a result.

There will be described specifically an operation example where the player terminal 20 receives the selection of the manual operation and the automatic operation from the player and moves the player character.

Operation of Player Terminal 20

Figure 9:
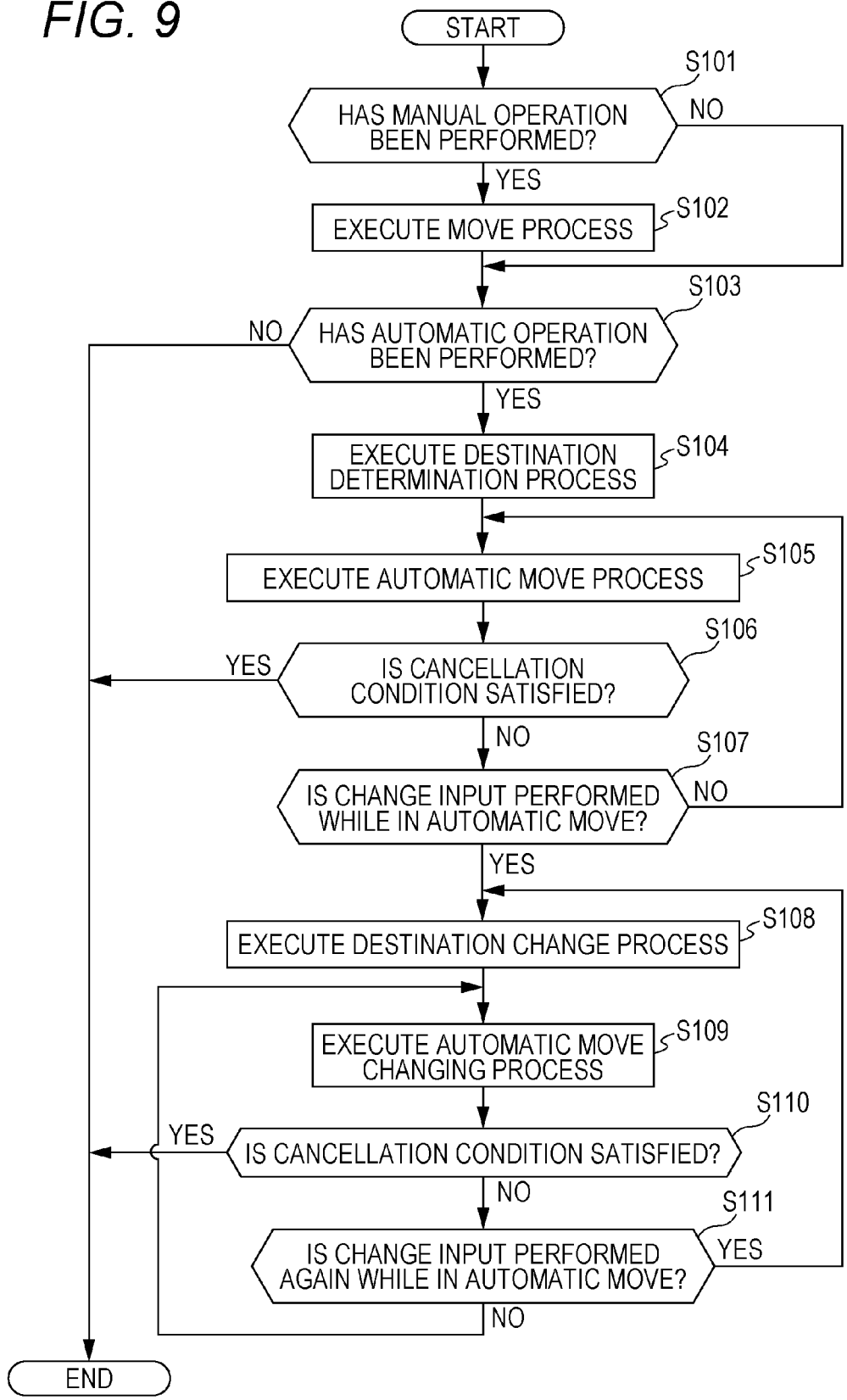
FIG. 9 is a flowchart illustrating an operation example of the player terminal.

FIG. 9 is a flowchart illustrating an operation example of the player terminal 20 according to the present embodiment.

First, the determination unit 217 of the player terminal 20 determines whether or not the manual operation is performed by the player (S101). A move process for the player character is executed (S102) when it is determined that the manual operation is performed (S101: YES). The process proceeds to step 103 when it is determined that the manual operation is not performed (S101: NO).

Figure 10:
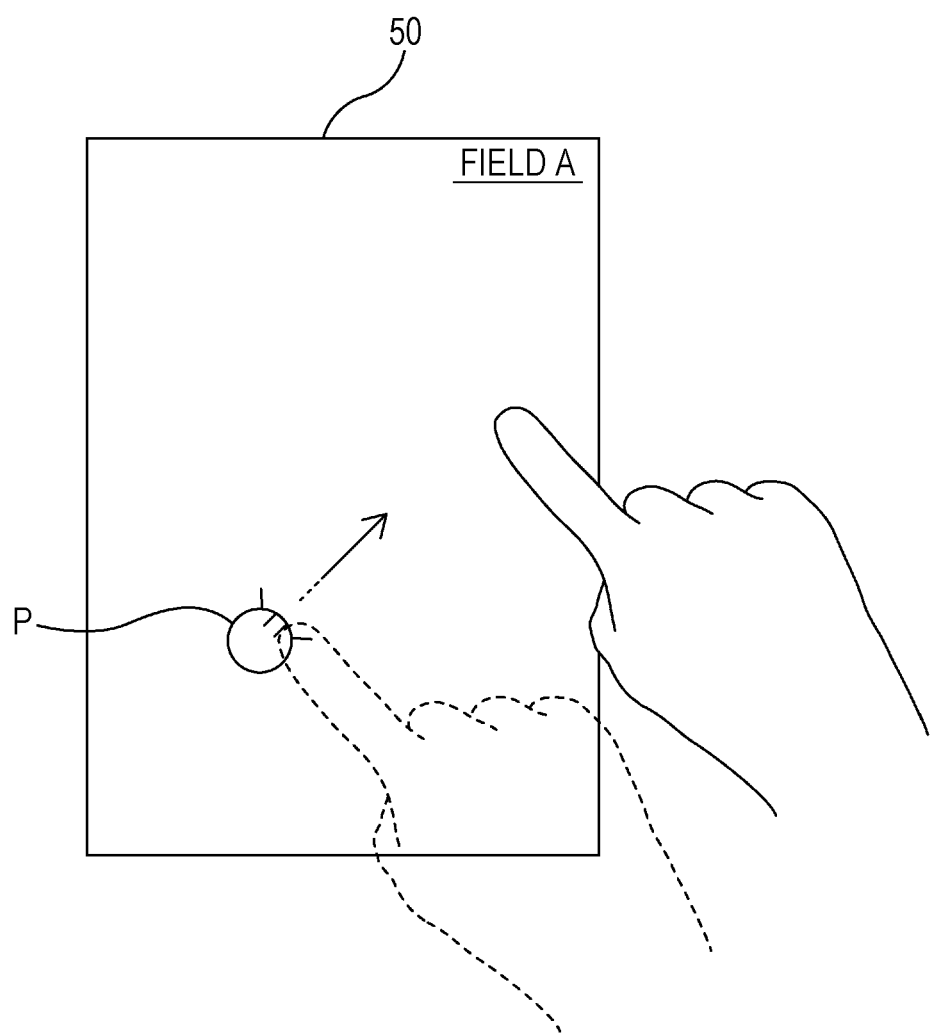
FIG. 10 is a diagram illustrating an example of a manual operation.

FIG. 10 is a diagram illustrating an example of the manual operation. A game screen 50 displays a field A in which a player character P is placed. The manual operation is performed by sliding the player character P displayed on the game screen 50 while touching the player character. The touch panel detects the touch operation input performed on the game screen 50 by the player when the player performs the manual operation. The move process unit 212 then specifies a move direction on the basis of the detected information from the touch panel and moves the player character P on the field A in the move direction. Note that the player character stops at a position where the player takes his/her sliding finger off of the game screen 50.

The determination unit 217 thereafter determines whether or not the automatic operation is performed by the player (S103). A destination determination process is executed (S104) when it is determined that the automatic operation is performed (S103: YES). The process is complete when it is determined that the automatic operation is not performed (S103: NO).

Figure 11:
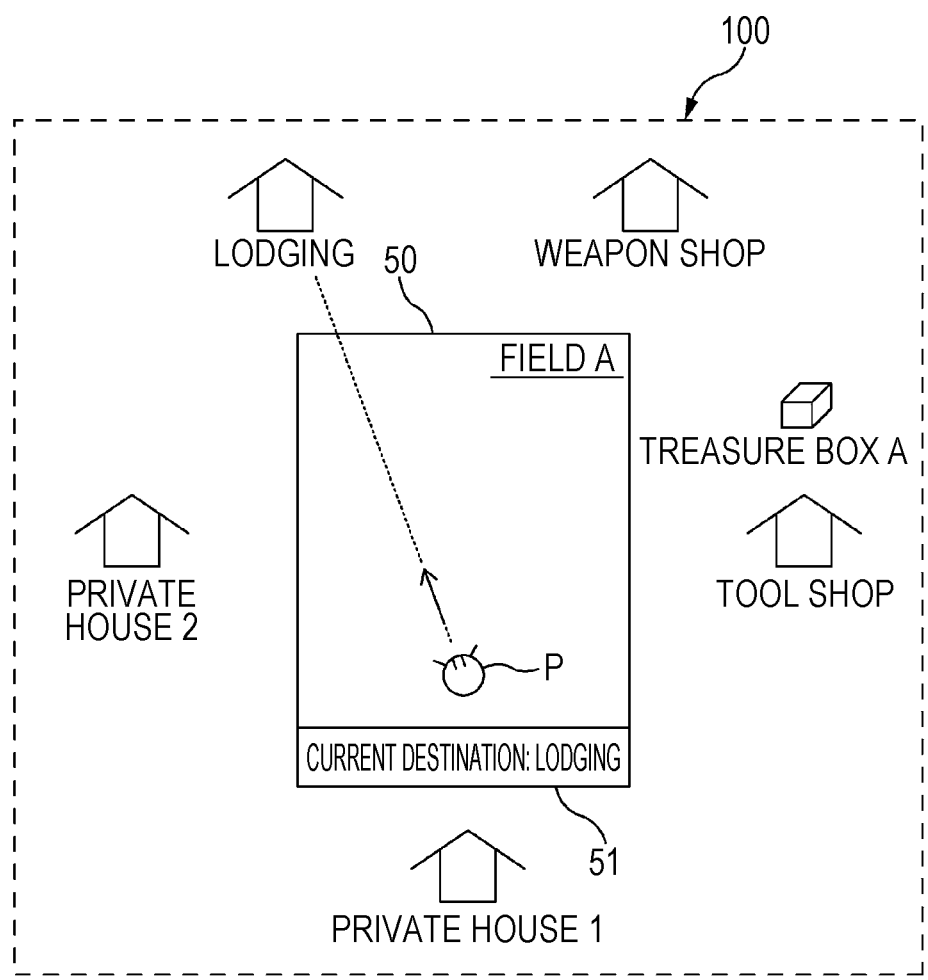
FIG. 11 is a diagram illustrating an example of an automatic operation.

FIG. 11 is a diagram illustrating an example of the automatic operation. The game screen 50 displays the player character P placed in the field A. The automatic operation is started when an arbitrary position on the game screen 50 is tapped. When the automatic operation is started, the touch panel detects the touch operation input performed on the game screen 50 by the player. The destination determination unit 213 then receives the automatic operation by the player on the basis of the detected information from the touch panel and executes the destination determination process. First, the destination determination unit 213 specifies the game field in which the player character is placed. The destination determination unit 213 then refers to the field information illustrated in FIG. 6 and the destination information illustrated in FIG. 7 to determine a destination (the first destination) from among the plurality of preset destinations. Specifically, the destination determination unit 213 refers to destination information (1) corresponding to the field A (refer to FIG. 6) since the player character P is placed in the field A. The destination determination unit 213 then selects the destination in numerical order from among the plurality of destinations set in the destination information (1) illustrated in FIG. 7. In other words, a "lodging" set at the top is selected as the destination (the first destination). The destination determination unit 213 at this time causes the terminal storage unit 22 to store flag information indicating that a current destination is the "lodging". Once the destination is determined, guidance information 51 indicating the current destination is displayed on the game screen 50 as illustrated in FIG. 11.

An automatic move process is executed (S105) after the destination determination unit 213 determines the destination (the first destination). That is, as illustrated in FIG. 11, the automatic move process unit 214 automatically moves the player character P on the field A toward the "lodging" (the first destination) determined by the destination determination unit 213 without any operation input by the player. At this time, the screen does not display a state where the player character P reaches the destination in an instant (an image illustrating how the player character P moves on the field A is omitted), but successively displays an image on the way to the destination (an image illustrating how the player character P moves on the field A is displayed).

Next, the determination unit 217 determines whether or not the player character on the automatic move satisfies an automatic move cancellation condition (S106). The process proceeds to step 107 when it is determined that the cancellation condition is not satisfied (S106: NO). When it is determined that the cancellation condition is satisfied (S106: YES), the automatic move process unit 214 cancels the automatic move of the player character, thereby completing the process.

Here, the cancellation condition means that the player character on the automatic move reaches the destination (the first destination) determined by the destination determination unit 213, or that a manual operation (an operation input to stop the automatic move of the player character) is performed while the player character is on the automatic move.

Subsequently, the determination unit 217 determines whether or not a destination change operation (a switch operation) is performed by the player while the player character is continuously on the automatic move (S107). A destination change process is executed (S108) when it is determined that the destination change operation is performed (S107: YES). The process returns to step 105 when it is determined that the destination change operation is not performed (S107: NO), in which case the player character continues to be on the automatic move.

Figure 12:
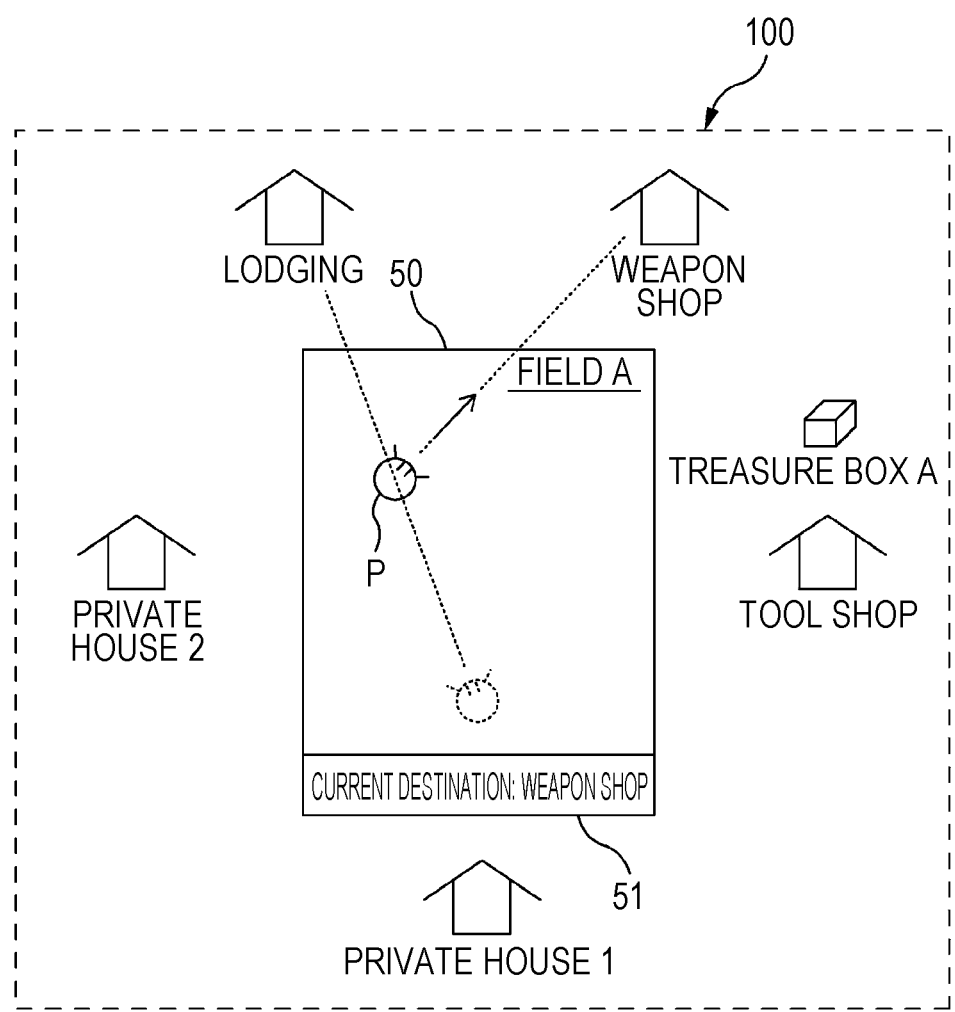
FIG. 12 is a diagram illustrating an example of a destination change operation.

FIG. 12 is a diagram illustrating an example of the destination change operation. Similar to FIG. 11, the game screen 50 displays the player character P moving automatically in the field A. The destination change operation is performed by tapping an arbitrary position on the game screen 50 while the player character P is on the automatic move (refer to FIG. 11). When the destination change operation is performed by the player, the touch panel detects the touch operation input performed on the game screen 50 by the player. The destination change unit 215 then receives the destination change operation by the player on the basis of the detected information from the touch panel, and executes the destination change process. First, the destination change unit 215 specifies a game field in which the player character P is placed. The destination change unit 215 then refers to the field information illustrated in FIG. 6 and the destination information illustrated in FIG. 7 to determine a changed destination (the second destination) from among the plurality of preset destinations. Specifically, the destination change unit 215 refers to the destination information (1) corresponding to the field A (refer to FIG. 6) since the player character P is placed in the field A. The destination change unit 215 then selects the destination in numerical order from among the plurality of destinations set in the destination information (1) illustrated in FIG. 7. In other words, a "weapon shop" set second in the order is selected as the destination (the second destination). The destination determination unit 213 at this time updates the flag information indicating the current destination by setting the "weapon shop" thereto. Once the changed destination is determined, the display of the guidance information 51 on the game screen 50 changes from the "lodging" to the "weapon shop" as illustrated in FIG. 12. Accordingly, the destination change unit 215 of the present embodiment selects a changed destination in the order of the "lodging", the "weapon shop", a "tool shop", a "private house 1", a "private house 2", and the "lodging" according to the destination information (1) every time the destination change operation is received from the player. The player can thus move the player character automatically to a desired destination without grasping beforehand the destination in the game field, whereby the operability can be improved.

An automatic move changing process is executed (S109) after the destination change unit 215 determines the changed destination (the second destination). That is, as illustrated in FIG. 12, the automatic move changing process unit 216 automatically moves the player character P headed to the "lodging" toward the "weapon shop" determined by the destination change unit 215 without any operation input by the player.

The determination unit 217 then determines whether or not the player character moving automatically toward the changed destination satisfies the automatic move cancellation condition (S110). The process proceeds to step 111 when it is determined that the cancellation condition is not satisfied (S110: NO). When it is determined that the cancellation condition is satisfied (S110: YES), the automatic move process unit 214 cancels the automatic move of the player character and completes the process.

Here, the cancellation condition means that the player character on the automatic move reaches the changed destination (the second destination) determined by the destination change unit 215, or that the manual operation (the operation input to stop the automatic move of the player character) is performed while the player character is on the automatic move.

Subsequently, the determination unit 217 determines whether or not the destination change operation is performed again by the player while the player character is continuously on the automatic move (S111). The process returns to step 108 when it is determined that the destination change operation is performed again (S111: YES), in which case the destination change process is re-executed. The process returns to step 109 when it is determined that the destination change operation is not performed again (S111: NO), in which case the player character continues to be on the automatic move.

As described above, the player terminal 20 according to the present embodiment can allow the player to select the automatic operation, out of the manual operation and the automatic operation, in order to automatically move the player character to the plurality of preset destinations without grasping the specific location of the destination to which the player character is headed. Unlike the manual operation, the player need not perform the operation input to specify the move direction of the player character when the automatic operation is selected. Moreover, the player can automatically move the player character to the destination set after the current destination among the plurality of preset destinations upon selecting the destination change operation while the player character is on the automatic move by the automatic operation. Furthermore, the player can smoothly switch the operation from the manual operation to the automatic move, and from the automatic move to the manual operation. The operability related to the movement of the player character can be improved as a result.

OTHER EMBODIMENTS

The above-described embodiment has been given for easy understanding of the present invention, and is not to construe the present invention in a limited manner. The present invention is modified and/or improved without departing from the spirit of the invention to be included therein.

<Automatic Operation>

The present invention is not limited to the case described in the aforementioned embodiment where the automatic operation is performed by tapping the arbitrary position on the game screen 50. The automatic operation may be performed by holding down the arbitrary position on the game screen 50 for a predetermined time or swiping, flicking, or double-tapping the game screen 50, for example. Likewise, the destination change operation may be performed by another operation.

<Destination Change Operation>

The present invention is not limited to the case described in the aforementioned embodiment where the destination is changed in the order according to the destination information illustrated in FIG. 7 when the player performs the destination change operation while the player character is on the automatic move. The changed destination may be directly specified by the player, not by the order set in the destination information illustrated in FIG. 7, for example. Specific description will be given below with reference to FIGS. 13 and 14.

Figure 13:
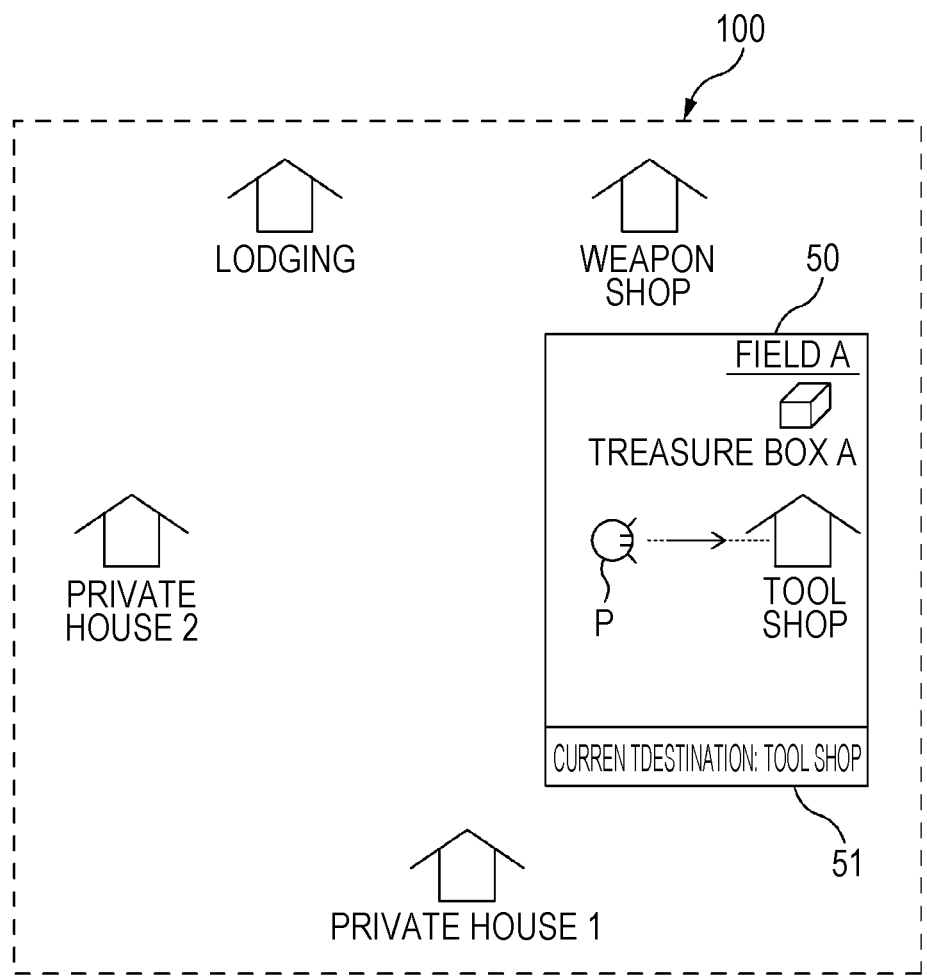
FIG. 13 is a diagram illustrating an example of a game screen including a character on an automatic move.
Figure 14:
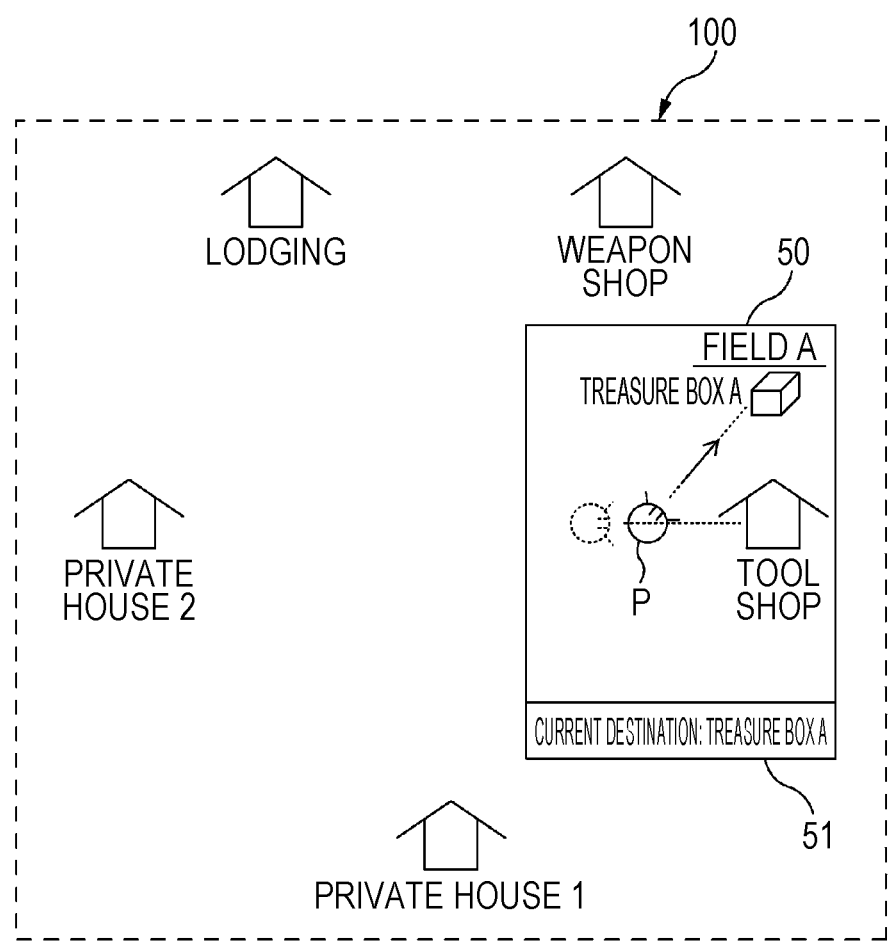
FIG. 14 is a diagram illustrating another example of the destination change operation.

FIG. 13 is a diagram illustrating an example of a game screen 50 including a character that is on automatic move. The game screen 50 displays a state where a player character P is automatically moving toward a "tool shop" on a field A. FIG. 14 is a diagram illustrating another example of the destination change operation. Here, a "treasure box A" is set as an object that can be directly specified by a player as a destination, and is highlighted (displayed in a balloon or blinking, for example) on the game screen 50. When the player taps the "treasure box A" highlighted on the game screen 50, a touch panel detects the touch operation input performed by the player on the game screen 50. A destination change unit 215 then receives a destination change operation on the basis of the detected information from the touch panel and determines the "treasure box A" as the changed destination. After the destination change unit 215 determines the "treasure box A" as the changed destination, an automatic move changing process unit 216 moves the player character P headed to the "tool shop" toward the "treasure box A". The player can thus perform an intuitive operation input by directly specifying the object.

Moreover, the present invention is not limited to the case described in the aforementioned embodiment where the changed destination is determined according to the order set in the destination information illustrated in FIG. 7. The destination change unit 215 may randomly select the changed destination from among a plurality of destinations set in the destination information illustrated in FIG. 7, for example.

<Game Screen 50>

Figure 15:
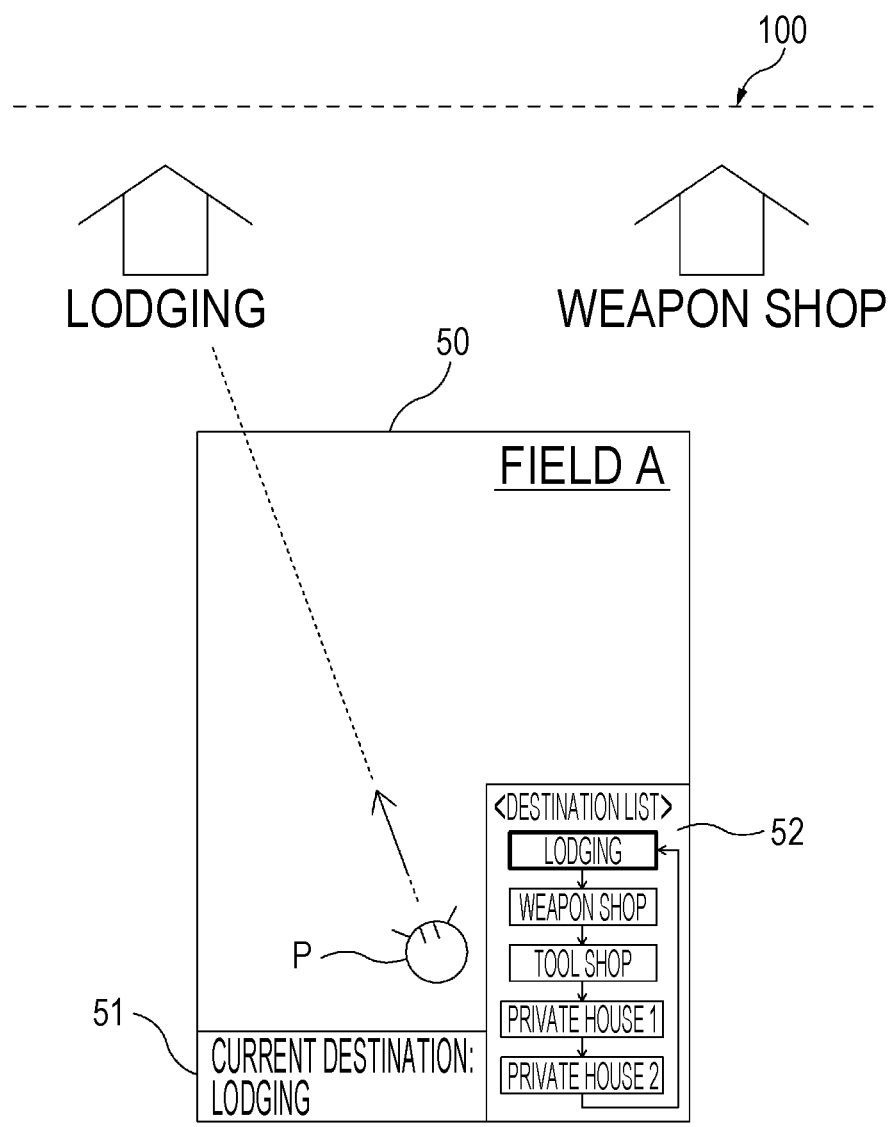
FIG. 15 is a diagram illustrating an example of a game screen including a destination list.

While the guidance information 51 indicating the current destination is displayed as illustrated in FIG. 11 in the aforementioned embodiment, a destination list 52 based on the destination information illustrated in FIG. 7 may also be displayed as illustrated in FIG. 15. This allows the player to grasp not only the current destination but a next destination.

Note that the destination list 52 may be not only displayed on the game screen 50 but also used as an operation panel. Specifically, as illustrated in FIG. 15, the touch panel detects a touch operation input performed by the player on the game screen 50 when the player taps any destination illustrated in the destination list 52 while the player character P is automatically moving toward a "lodging" on the field A. The destination change unit 215 then receives the destination change operation on the basis of the detected information from the touch panel, and determines the destination tapped by the player in the destination list 52 as the changed destination. Accordingly, the player can freely select the changed destination from the destination list 52. That is, the player can skip one destination and directly specify a next destination in the list as the changed destination (meaning that the player can directly specify the "tool shop" as the destination after the "lodging" regardless of the order in the destination list 52), for example.

<Destination Information>

In the aforementioned embodiment, the plurality of destinations set in the destination information illustrated in FIG. 7 may be adapted to be customized by the player. A new destination may be registered additionally or the order of the destination may be switched according to an operation by the player, for example.

<Server Device>

In the above-described present embodiments, the game system 1 provided with one server device 10 as an example of a server device has been exemplarily described. However, the game system 1 is not limited to this example, and may be provided with a plurality of server devices 10 as an example of the server device. Specifically, a plurality of server devices 10 may be connected through a network 2, and each of the server devices 10 may perform various types of processing in a distributed manner.

<Information Processing Device>

The present invention is not limited to the case described in the aforementioned embodiment where, in the game system 1, the player terminal 20 executes the various information processes on the basis of the game program. That is, the server device 10 alone may execute the various information processes on the basis of the game program.

Moreover, the server device 10 may be configured to take a part of the function as the information processing device. The server device 10 and the player terminal 20 configure the information processing device in this case.

Note that the information processing device is an example of the computer.

What is claimed is:

1. A non-transitory computer-readable storage medium storing game program which causes a computer to execute:
   an auto-movement process, during which, if a player character positioned within a game field from a plurality of game fields, and, at the same time, a region having no destinations positioned therein are displayed on a game screen, whenever a player's auto-operation specifying any location in said region of the game field is performed, destination information, comprising information regarding a plurality of destinations configured in the game field, is used to select a destination serving as an endpoint of travel from the plurality of destinations and automatically move the player character positioned in the game field within the game screen towards said endpoint destination positioned in the game field outside the game screen, wherein the destination information is selected from a plurality of destination information based on the game field in which the player character is positioned, wherein each of the plurality of destination information is associated with a corresponding game field from the plurality of game fields, and
   a manual movement process, during which, when said region within the game field is displayed on the game screen, the automatic travel of the player character automatically moving towards said endpoint destination is terminated in response to a manual operation by the player specifying a direction of travel of the player character in said region of the game field, and the player character is moved in the direction of travel
   wherein:
   the computer includes a display module that displays a game screen that includes the player character on the game field and a touchscreen panel used by the player to enter touch gestures on the game screen,
   the auto-movement process automatically moves the player character towards the destination when a touch gesture corresponding to the auto-operation is entered on the touchscreen panel by the player, and the manual movement process moves the player character in the direction of travel when a touch gesture corresponding to the manual operation is entered on the touchscreen panel by the player.

2. The non-transitory computer-readable storage medium according to claim 1, wherein:
   the touch gesture corresponding to the manual operation is a gesture performed by the player by touching and sliding across the touchscreen panel, and
   the manual movement process moves the player character in a direction of travel determined based on the direction specified by the player's sliding gesture.

3. The non-transitory computer-readable storage medium according to claim 1,
   wherein:
   the touch gesture corresponding to the auto-operation is a gesture whereby a player taps on the touchscreen panel, and
   the auto-movement process automatically moves the player character towards the destination if any location in the game field is specified by the player's tapping gesture.

4. An information processing device, comprising:
   an auto-movement processing module which, if a player character positioned within a game field from a plurality of game fields, and, at the same time, a region having no destinations positioned therein are displayed on a game screen, whenever a player's auto-operation specifying any location in said region of the game field is performed, uses destination information, comprising information regarding a plurality of destinations configured in the game field, to select a destination serving as an endpoint of travel from the plurality of destinations and automatically move the player character positioned in the game field within the game screen towards said endpoint destination positioned in the game field outside the game screen, wherein the destination information is selected from a plurality of destination information based on the game field in which the player character is positioned, wherein each of the plurality of destination information is associated with a corresponding game field from the plurality of game fields, and
   a manual movement processing module which, when said region within the game field is displayed on the game screen, terminates the automatic travel of the player character automatically moving towards said endpoint destination in response to a manual operation by the player specifying a direction of travel of the player character in said region of the game field, and moves the player character in the direction of travel;
   wherein:
   the information processing device comprises a display module that displays a game screen that includes the player character on the game field and a touchscreen panel used by the player to enter touch gestures on the game screen,
   the auto-movement processing module automatically moves the player character towards the destination when a touch gesture corresponding to the auto-operation is entered on the touchscreen panel by the player, and the manual movement process moves the player character in the direction of travel when a touch gesture corresponding to the manual operation is entered on the touchscreen panel by the player.

* * * * *